Figure 1:
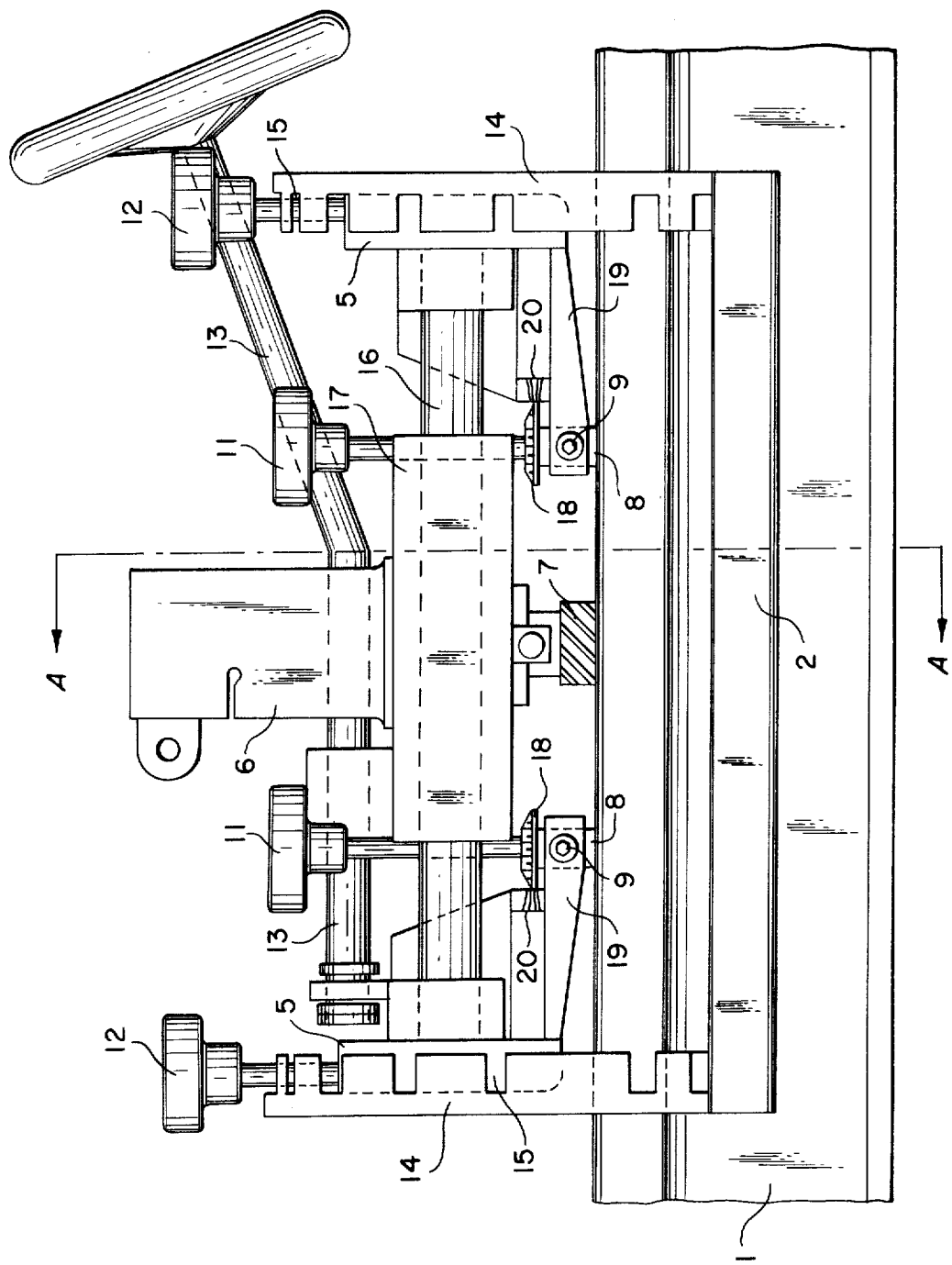

United States Patent [19]
Tabert

[11] 3,889,575

[45] June 17, 1975

[54] DEVICE FOR PROFILING THE RAIL HEAD OF VIGNOLES RAILS

[75] Inventor: Paul Tabert, Cologne-Bayenthal, Germany

[73] Assignee: Elektro-Thermit GmbH, Germany

[22] Filed: Mar. 21, 1973

[21] Appl. No.: 343,252

[30] Foreign Application Priority Data

Apr. 7, 1972 Germany............................ 2216692

[52] U.S. Cl....................... 90/12 A; 90/16; 51/178; 51/241 LG
[51] Int. Cl.......................... B23c 1/20; B24b 23/00
[58] Field of Search............. 90/12 A, DIG. 2, 12 R, 90/16; 51/178, 241 LG

[56] References Cited
UNITED STATES PATENTS 1,216,097   2/1917   Eunson ............................... 90/12 A

FOREIGN PATENTS OR APPLICATIONS

| 626,511 | 3/1936 | Germany | 51/178 |
| 905,984 | 3/1954 | Germany | 51/241 LG |
| 1,231,751 | 10/1960 | France | 51/178 |

*Primary Examiner*—Andrew R. Juhasz
*Assistant Examiner*—Z. R. Bilinsky
*Attorney, Agent, or Firm*—James E. Bryan

[57] ABSTRACT

This invention relates to a device for profiling a rail head comprising frame means adapted to be mounted on a rail, profiling tool means mounted on said frame means, and a pair of feeler screw means mounted on said frame means and adapted to touch said rail, whereby the touching points of said feeler screw means and the working surface of said profiling tool means are maintained in the same plane parallel to the axis of said frame means.

4 Claims, 2 Drawing Figures

DEVICE FOR PROFILING THE RAIL HEAD OF VIGNOLES RAILS

The present invention relates to a device for profiling the rail head of Vignoles rails by milling off projections or projecting portions, by means of a milling apparatus which is rigidly connected with the rail and comprises a guide rod and feelers for tapping or scanning the rail profile.

For purposes of protecting the top of the roadbed and rail vehicles, for reducing noise, as well as for assuring a smooth running of the rail vehicles, it is desirable that the contact surfaces between rail and wheel be free of deviations in shape in neighboring cross-sections, if at all possible.

During welding operations on rails, however, there arises or exists at the rail joint or bond a shape deviation due to projecting welding material. This material was removed heretofore by means of relatively coarse grinding processes.

Thus, German Pat. No. 1,182,281, for example, describes a motor driven grinding machine which is manually movable on rollers on a rail, which machine is pivotal as a unit about the rail head to be ground transversely to the longitudinal rail axis, and which is provided with guide members positioned approximately at a right angle to the traveling plane determined by the rollers, and being disposed on one rail side only. These guide members are movable transversely to the rail head, and the rollers are provided with rim faces or treads on the rail side positioned opposite the guide members. The guide members are movable transversely to the rail in a manner such that, during such movement, the angle between the guide plane and the traveling plane determined by the guide members will not change.

Another type of grinding device is disclosed in German Pat. No. 1,274,610. This grinding machine or device is a rail grinding machine or device which is manually movable or displaceable on one or both rails of a track for the purpose of grinding the rail tread and the lateral rail head surfaces. This machine or device comprises a chassis frame guided by means of rollers on the rail and/or rails, and a machine frame equipped with feeler rolls carrying the grinding device. The machine frame is pivotal, with respect to the chassis frame, about an axis which is stationary with respect to the machine frame and extends in the longitudinal vehicle direction. The axis which is stationary with regard to the machine frame is pivotal about an axis which extends parallel thereto and is stationary with respect to the chassis frame.

The prior art grinding machines or devices have the disadvantages that deviations in the rail head form, or shape of the grinding points or spots, will be produced with respect to or as compared to the rail head shapes adjoining them, and specifically in the longitudinal direction, due to the fact that the feeler rolls mounted at the machine frame on both sides of the grinding body transmit — due to the axial distance thereof, the moving length during travel over the guide surface adjoining the grinding point or spot of the rail head shapes, in the case of longitudinal or transverse bends of the rails, and in the case of varying rail head shapes or foreign substances possibly existing in the traveling area — alternating, or variable, longitudinal inclinations upon the grinding body so that the grinding plane is not linearly parallel to the two adjoining or connecting planes of the rail.

In the transverse direction positioned at a right angle to the longitudinal axis, the deviations are produced because of the fact that the position of the grinding surface parallel to the tangents of the rail head shape by inclination of the machine frame by hand is only approximately possible without a firm lateral guide relation to the rail head shape. Furthermore, during the transverse inclination of the machine frame, there is produced a lateral displacement of the feeler roll longitudinal axis as compared to and with respect to the longitudinal rail axis, i.e., a parallel distance between the line of the points of support of the feeler rolls and of the grinding body surface parallel thereto. This distance can be adjusted by hand, during each alteration or change of the transverse inclination, only approximately by lifting or lowering the grinding body to the line between the feeler contact points, namely the rail and the feeler rolls.

It is further disadvantageous that, during grinding by hand, a longitudinal and a transverse movement of the rail frame, as well as a lifting or lowering of the grinding body take place simultaneously, and all of the movements of the machines may be differently long or deep. Moreover, only for the longitudinal movement is the approximately correct guide of the grinding body assured by means of feeler rolls. Likewise, the transverse movements of the machine frame, as well as the lifting or lowering of the grinding body, are made only by an eye measurement on the basis of a comparison of the ground surfaces with the reference surface of the rail head shape adjoining the same, and hence the correct position of the grinding body with respect to the reference surface is given or obtained only approximately. In addition thereto, the materials of the grinding body and of the rails being removed as or in the form of glowing, sputtering sparks involve the danger of accidents or fires. The danger of an accident further may arise due to the bursting of the grinding discs. Also, the grinding operation produces noises whose decibel number often exceeds that which is admissible for the environmental protection.

Also already known is a device for maching welded rail joints or bonds true to profile, which allows for the removal of the projections by planing, milling, or the like. A device of this type has been described in German Pat. No. 905,984. In this a guide rod or bar extending in the longitudinal direction of the rail is resiliently positioned within a rack or frame adapted to be clamped or pressed at the rail heads on both sides of the joint, which guide rod guides a specimen holder that is moved to and fro by a drive means and holds the working tool. The device is provided at the ends thereof with one feeler each, resting or supported on the rail next to the welding point, or welded area, and each is furthermore parallelly displaceable. The feelers and the working tool are cylindrical and have the same diameter, and the axes thereof are in alignment.

This device has not met with success in its use or application in actual practice since, as has been set forth in the patent, the guide rod together with the working tool is elastically positioned by way of a gear rack. The purpose of this arrangement is the usability of the device for rails having different profiles. It is intended therein that, due to the elastic positioning, the tool is to be raised above the elevated or projecting welded area; in other words, the feelers are not to remain constantly on the rail surface, but are intended to be respectively lifted off and pressed down again. Such a resilient positioning in conjunction with the vibration of the working tool being caused thereby does not, however, assure with certainty a machining true to profile of the rail head. The stability of the working tool necessary for either planing or milling is not assured by the elastic feelers since the required counteracting force and incidence force, respectively is lacking. The tools therein follow of necessity the elevations of the rail surface which are compensated for only by means of the counteracting force of the spring, insufficiently and particularly in an uncontrollable fashion.

Furthermore, the device illustrated in the patent comprises relatively expensive means for machining the rail head true to profile and for the guide of the working tool or instrument. The number of parts subject to wear and tear is of necessity relatively large. In summation, it can be stated that with this device only a clearing or broaching of the rail — similar to a filing operation — is practically possible.

The present invention aims at creating and providing a device for profiling the rail head and, respectively, for the removal true to profile of excess welding material produced on the rails during welding operations, in which the disadvantages and drawbacks referred to hereinabove do not arise, and wherein the treating surfaces are connected with the rail head shapes of the adjoining rail with the smallest possible lateral or height differences.

This object is obtained, in accordance with the present invention, in that a milling insert comprises a milling head as well as two adjustable screws, wherein the rising points of the feeler screws and the working surface of the milling head are positioned in the same plane which is parallel to the longitudinal axis of the milling insert.

In a preferred embodiment of this device the milling insert is positioned within a guiding frame consisting of two lateral plates and crosstie rods connecting the same, these two lateral plates each having guide slots facing each other and within which the milling insert is detachably secured by means of screws. The aforementioned guide slots extend at a right angle to the tangents of the rail head curvature.

It is of particular advantage that the lateral plates have recesses enclosing the rail head and resting tangentially against the lateral surface and against a point of the rail tread of the rail head.

For the purpose of attaching the guide frame to the rail head, the inventive device preferably clamping members together with screws.

The device proposed by the present invention not only satisfies the requirements outlined above, but in addition thereto affords a number of specific advantages. One significant advantage of the inventive device is that the movement of the tool, i.e., the milling tool in the present case, takes place only in one direction, and that the machining true to profile of the rail head is accomplished by a simple change of the milling insert in the lateral slots. For this reason, the inventive device is very simple in the operation thereof. More particularly, it is possible to avoid with absolute certainty that material is machined out of the rail as a consequence of improper handling of the device.

By virtue of the rigid clamping of the inventive device to the rail to be treated or machined, vibrations and the like at the tool are avoided so that a long service life of the tool is effectively obtained.

The inventive device may be provided with additional or auxiliary means which serve for operating safety and operating accuracy as well as the protection of the machine. Thus it is possible, for example, to laterally supply to the milling head a cooling and/or lubricating agent through a corresponding nozzle, in which case the nozzle will suitably execute concomitantly the same movement as the milling head in order that the cooling and/or lubricating agent is conveyed with certainty to the points or places to be cooled and/or lubricated in any position of the milling head.

The feeler screws are desirably in operative engagement with a graduated scale, and the graduated scales of the two feeler screws are identical with respect to each other. The same values of the feeler screws signify the parallelism of the feeler screw support frames with regard to the axis of the milling insert. By means of a corresponding rotation of the screws, the milling insert carrying the milling head is brought into alignment with the supporting surface of the feeler screws. A readjustment of the screws is necessary only when the milling head is replaced.

In order to insure additional safety, the feeler screws are suitably secured against a twisting or torsion from the position thereof by appropriate means.

All of these measures have the effect that, after the removal of the excess material, such as is produced, for example, on rails in the course of welding operations, the tread and the lateral surfaces are linearly planar in the longitudinal direction of the rails. As a result thereof, the welded joint can be traveled over or negotiated by rail vehicles without any elevational or lateral jolts. Moreover, the rail head shape within the surfaces being treated has only extremely small tolerances of, for example, +0.03 mm with respect to, or as compared to, the rail head shapes adjoining the surfaces treated.

By virtue of the proposed attachment of the inventive device to the rail, the assembly and disassembly of the device proposed by the present invention is effected within a short period of time, which assures that traffic can be continued without interruption. By reason of the simplicity of the construction of this inventive device, also its weight is so reduced that it can be lifted off and removed by a single worker.

Figure 2:
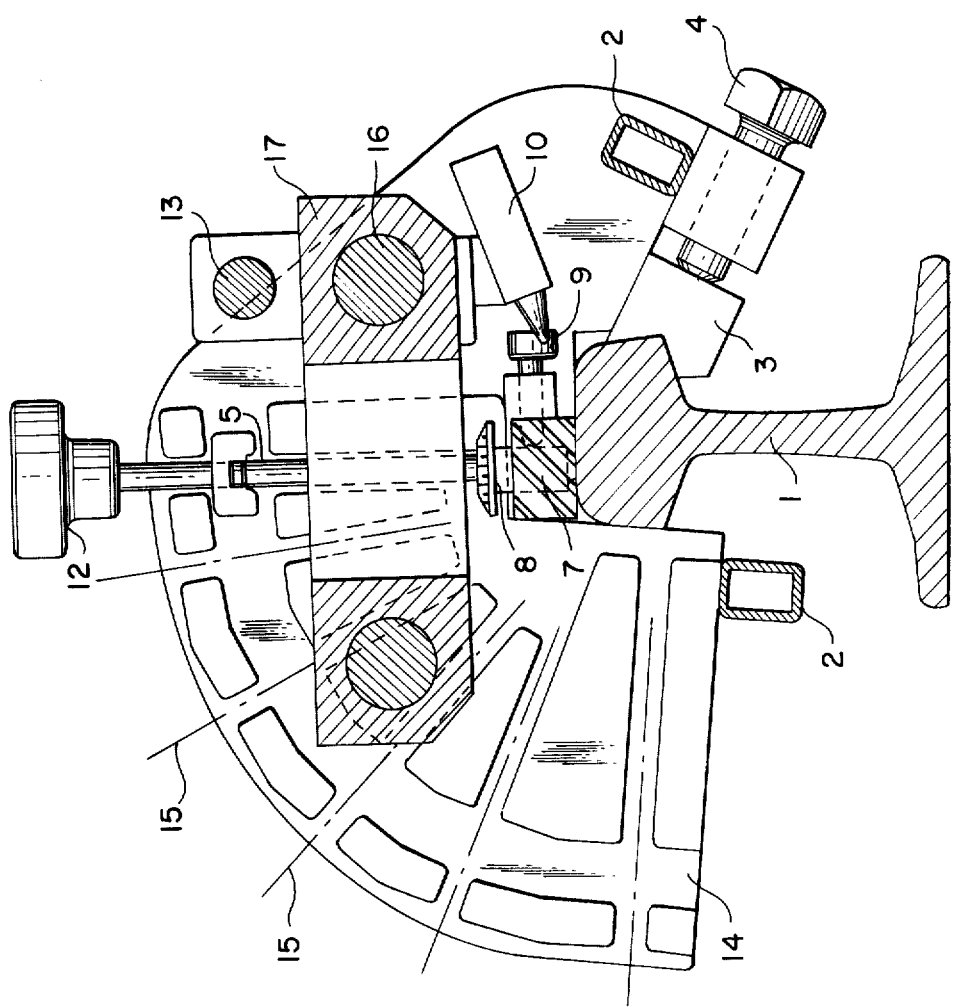

The inventive device will not be further described hereinafter on the basis of and taken in connection with the accompanying drawings, wherein FIG. 1 is a front elevational view of the inventive device in the longitudinal direction, and FIG. 2 is a cross-sectional view through the inventive device taken along line A—A of FIG. 1.

In FIG. 1, the rail is identified with reference numeral 1. The guide frame of the device is constituted by the traverses or crosstie rods 2, one of which is visible in this figure, and of the lateral plates 14. The milling insert is identified with reference numeral 5; it carries the milling head 7. Glidingly mounted on the milling insert and through a spindle 13 is the support 17 which may be moved to and fro in the longitudinal direction on the rods 16. Reference numeral 6 designates the connecting coupling to the drive shaft of a motor (not shown herein) serving for rotating the milling head 7. The milling insert 5 is laterally positioned in the guide slots 15 of the lateral plates 14 and secured in position by means of the screws 12. They simultaneously transmit the force with which the feeler screws 8 are pressed upon the rail head. These screws 8 are arranged in each case on a carrier 19 which is positioned in the central axis of the milling insert 5 and is provided with a thread. The feeler screws 8 are displaceable with respect to the height thereof in this carrier 19 and can be secured in position by means of the locking screws 9. Each feeler screw 8 is provided at the upper side thereof with a disc 18 having a graduation or scale thereon, which disc in turn points toward a scale or dial 20 mounted at the carrier 19. The scale or dial 20 indicates initially the zero value of the rotation of each feeler screw 8 and, respectively, of the graduated disc 18 connected thereto. It further shows by corresponding graduation lines the number of revolutions of the disc 18 connected with the feeler screw 8. Reference numeral 11 indicates in each case a wheel with the aid of which the rotation of the feeler 8 is effected. After adjusting the feeler screws 8 to the same graduated values corresponding to the scales or dials 18 and 20, the feeler screws 8 are locked in position by means of the locking screws 9. The adjustment of the feeler screws 8 must be made in a manner such that they will represent or form a parallel line with the working surface of the milling head 7 and the rods 16 of the milling insert 5.

FIG. 2 is a cross-sectional view through the device shown in FIG. 1, taken along line A—A of FIG. 1. This figure shows clearly the traverses 2 of the guide frame. These traverses 2 are connected with the lateral plates 14, the latter having guide slots 15. It is further apparent from this figure that the guide frame, for purposes of being attached to the rail head, is secured by means by clamping members 3 having the screws 4. This cross-sectional view moreover shows distinctly that the lateral plates 14 have recesses enclosing the rail head and resting tangentially against the rail lateral surfaces and against a point of the rail tread of the rail head. It is also evident from this figure that the screw 12 presses the milling insert 5 with the support 17 onto the feeler screw 8. The feeler screw 8 is detachably held in its position by means of the locking screw 9.

Reference numeral 10 indicates the supply line of a cooling and/or lubricating agent to the tool 7. This supply line or means comprises, on the side facing the tool, a nozzle so as to convey the cooling and/or lubricating fluid in a directly aimed manner to the point of the application thereof. The supply line or means 10 is secured to the support 17. The remaining reference numerals identify the elements already shown, described and referred to in connection with FIG. 1.

It will be obvious to those skilled in the art that many modifications may be made within the scope of the present invention without departing from the spirit thereof, and the invention includes all such modifications.

What is claimed is:

1. A device for profiling a rail head having a rail head curvature comprising
   frame means adapted to be mounted on a rail,
   means for securing said frame means to said rail, said frame means including
   two parallel plates having rail head engaging recesses therein,
   a plurality of guide slots in each of said plates, said guide slots projecting generally radially from each said recess and extending at right angles to the tangents of the rail head curvature
   guide means connecting said plates, said guide means being selectively mounted in parallel guide slots of said plates
   profiling tool means mounted on said guide means, said tool means including a rail head contacting working surface.
   a pair of feeler screw means connected to said guide means and adapted to touch said rail, whereby the touching points of said feeler screw means and the working surface of said profiling tool means are maintained coplanar,
   and screw means for securing said guide means in said guide slots and for forcing said feeler screw means against the rail head.

2. A device according to claim 1 in which said means for securing said frame means to said rail comprises clamping means for attaching said frame means to said rail head.

3. A device according to claim 1 in which said recesses are adapted to enclose the rail head and to rest tangentially against a lateral rail surface and against a point of the rail tread.

4. A device according to claim 1 in which said profiling tool means is a milling tool.

* * * * *